United States Patent
Liang

(10) Patent No.: US 10,164,449 B2
(45) Date of Patent: Dec. 25, 2018

(54) MOBILE TERMINAL CHARGER

(71) Applicant: ZTE CORPORATION, Shenzhen, Guangdong Province (CN)

(72) Inventor: Xilin Liang, Shenzhen (CN)

(73) Assignee: XI'AN ZHONGXING NEW SOFTWARE CO., LTD., Xi'an, Shaanxi (CN)

( * ) Notice: Subject to any disclaimer, the term of this patent is extended or adjusted under 35 U.S.C. 154(b) by 341 days.

(21) Appl. No.: 14/910,684

(22) PCT Filed: Feb. 27, 2014

(86) PCT No.: PCT/CN2014/072611
§ 371 (c)(1),
(2) Date: Feb. 6, 2016

(87) PCT Pub. No.: WO2014/161409
PCT Pub. Date: Oct. 9, 2014

(65) Prior Publication Data
US 2016/0197500 A1 Jul. 7, 2016

(30) Foreign Application Priority Data

Aug. 13, 2013 (CN) .................... 2013 2 0494668 U

(51) Int. Cl.
*H02J 7/04* (2006.01)
*H02J 7/00* (2006.01)
(Continued)

(52) U.S. Cl.
CPC ........... *H02J 7/0029* (2013.01); *H02H 3/085* (2013.01); *H02H 7/18* (2013.01); *H02J 7/007* (2013.01);
(Continued)

(58) Field of Classification Search
CPC ....... H02J 7/0029; H02J 7/0031; H02J 7/0042
(Continued)

(56) References Cited

U.S. PATENT DOCUMENTS

2004/0252006 A1* 12/2004 Kojima ............... H01C 1/1406
338/22 R
2008/0096429 A1 4/2008 Mikolajczak et al.
(Continued)

FOREIGN PATENT DOCUMENTS

CN 201515249 U 6/2010
CN 102109390 A 6/2011
(Continued)

*Primary Examiner* — Edward Tso
*Assistant Examiner* — Aaron Piggush
(74) *Attorney, Agent, or Firm* — Ling Wu; Stephen Yang; Ling and Yang Intellectual Property

(57) ABSTRACT

A mobile terminal charger relates to the field of mobile terminals such as cell phone and data card with battery charging. The mobile terminal charger comprises: a thermistor and a charger output protection circuit, wherein the thermistor mounted on a head of a connector accesses a charger circuit via a charger direct current (DC) cable, constitutes a charger loop resistor with the resistor in the charger; and the charger output protection circuit cuts off or reduces the output power of the charger when the resistance of the charger loop resistor is less than the overcurrent protection threshold value.

14 Claims, 4 Drawing Sheets

(51) Int. Cl.
*H02H 3/08* (2006.01)
*H02H 7/18* (2006.01)
(52) U.S. Cl.
CPC .......... *H02J 7/0031* (2013.01); *H02J 7/0042* (2013.01); *H02J 7/0052* (2013.01); *H02J 2007/0039* (2013.01)
(58) Field of Classification Search
USPC .......................................... 320/114, 150, 152
See application file for complete search history.

(56) References Cited

U.S. PATENT DOCUMENTS

| | | | |
|---|---|---|---|
| 2009/0237852 A1 | 9/2009 | Lin et al. | |
| 2010/0315752 A1* | 12/2010 | Rabu | H01R 13/6683 361/103 |
| 2011/0104940 A1* | 5/2011 | Rabu | H01R 13/7137 439/502 |
| 2011/0136352 A1 | 6/2011 | Liu et al. | |
| 2011/0268152 A1* | 11/2011 | Becker | G01K 7/023 374/179 |

FOREIGN PATENT DOCUMENTS

| | | |
|---|---|---|
| CN | 202917737 U | 5/2013 |
| CN | 103162851 A | 6/2013 |
| JP | H042480 U | 1/1992 |
| JP | 2006171860 A | 6/2006 |
| WO | 2009019801 A1 | 2/2009 |

\* cited by examiner

MOBILE TERMINAL CHARGER

TECHNICAL FIELD

The present document relates to the field of mobile terminals such as cell phone and data cards with battery charging, and more particularly, to a mobile terminal charger.

BACKGROUND OF THE RELATED ART

With the development of mobile terminal technology, the function required by the user gets more, the screen size gets bigger, and the battery capacity required by terminals also gets more, so the charger power for charging the cell phone gets higher. In the charging process with large current, many terminal users have encountered safety problem that the connector of the output terminal of the charger is burnt melted after the occurrence of micro-short circuit when the cell phone is charging, particularly for the current general connector of the Micro Universal Serial Bus recommended by the globe, due to the limit of structure and size, when in use by the user, a large amount of conductive liquid and metal powder is formed by the entry of foreign matter, the plug and the socket being damaged by slantingly inserting and pulling, the plug being bent and broken due to excessive force, resulting in the micro-short circuit of data line or charger within the plug; the micro-short circuit cannot achieve the protection condition of charger short circuit, causing the charger to continuously output power which is changed to heat at the plug of data line, finally resulting in that the data line or the charger plug or the cell phone interface are heated to melt, smoke and be on fire, etc. The mobile terminals of current brands in the market all have the similar problem such that the user worries about the safety when using the cell phone, more seriously causing damage to the human body and property of the user. The specification for the safety problem of such electrical products in high-end markets such as in Japan and Europe is strict. Such problem is an incident of product safety, and even the national law prescribes that all the products will be recalled with severe punishment if the malfunction reaches a certain level. As the battery capacity of the terminal products gets larger, the ratio of the occurrence and the influence of such problem get severe, so the solution for such problem gets urgent.

As for the charger safety of terminal products on the market, the safety detection and protection are merely conducted on the battery and cell phone, for example, in 201010296579.4, the temperature identification circuit used for battery protection board is only a temperature identification circuit added on the battery protection board, and only solves the problem of abnormal heating of the battery charging. The temperature protection for the charger and the terminal interface has not been implemented, but such problem is generally occurred on the market. Some high-end customers also put forward the requirement on this safety protection. The current terminal battery capacity and charger power are smaller, so the occurrence of such problem will become more prominent with the widespread use of large battery capacity and large power charger.

SUMMARY

The embodiments of the present document provide a mobile terminal charger to solve the safety problem that the connector of the output terminal of the charger is burnt melted after the occurrence of micro-short circuit when the cell phone is charging.

The embodiments of the present document disclose a mobile terminal charger, comprising: a thermistor and a charger output protection circuit, wherein:

the thermistor is configured to be mounted on a head of a connector, access a charger circuit via a charger direct current (DC) cable, constitute a charger loop resistor with a resistor in the charger; and the charger output protection circuit is configured to cut off or reduce output power of the charger when a resistance of the charger loop resistor is less than an overcurrent protection threshold value.

Preferably, the above mobile terminal charger further comprises a voltage stabilizing circuit, wherein the voltage stabilizing circuit is configured to reduce the output power of the charger when the resistance of the charger loop resistor is greater than the overcurrent protection threshold value.

Preferably, in the above mobile terminal charger, the thermistor adopts a positive temperature coefficient (PTC) resistor, and is in series with the resistor in the charger.

Preferably, in the above mobile terminal charger, the thermistor adopts a negative temperature coefficient (NTC) resistor, and is in parallel with the resistor in the charger.

Preferably, in the above mobile terminal charger, the charger output protection circuit at least comprises a short protection circuit, an overcurrent protection circuit, and an overvoltage protection circuit.

Preferably, in the above mobile terminal charger, the thermistor is mounted on a printed circuit board (PCB) connected with the head of the connector.

Preferably, in the above mobile terminal charger, the thermistor is a thermistor that a plug-in is wave-soldered on the PCB.

Preferably, in the above mobile terminal charger, the thermistor is a thermistor that a patch resistor is reflow-soldered on the PCB.

Preferably, in the above mobile terminal charger, the thermistor is a thermistor that is directly buried into the PCB.

Preferably, in the above mobile terminal charger, the thermistor is a thermistor that is made of resistor-capacitor material.

In the embodiments of the present document, the thermistor is mounted on the head of the connector, the temperature increases when the abnormal occur, the resistance of the thermistor, PTC resistor or NTC resistor, changes, thereby causing the resistance of the charger loop resistor also to change; when the resistance of the loop resistor reaches the overcurrent or short circuit protection threshold of the charger, the charger cuts off the output, the temperature falls, so as to protect the head of the data line or the charger from damaging.

PREFERRED EMBODIMENTS OF THE INVENTION

The technical schemes of the embodiments of the present document will be described in detail below in conjunction with accompanying drawings. It should be illustrated that the embodiments in the present application and the features in the embodiments can be combined with each other randomly without conflict.

EXAMPLE 1

Figure 1:
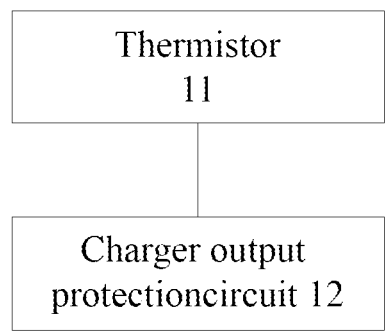
FIG. 1 is a structural diagram of the mobile terminal charger in the embodiments of the present document.

After the occurrence of micro-short circuit, with respect to whether it could be protected in designing to cut off the power loop to avoid heating, no scheme is feasible in view of the interior of the charger. If the temperature detection is introduced from the interior of the head of the connector to the interior of the charger for controlling, the line is longer with high cost and the temperature detection is inaccurate. Thus, the embodiments of the present document provide a mobile terminal charger, as shown in FIG. 1, comprising at least a thermistor 11, and a charger output protection circuit 12, wherein:

the thermistor 11 mounted on a head of a connector accesses a charger circuit via a charger direct current (DC) cable, constitutes a charger loop resistor with the resistor in the charger; and a charger output protection circuit 12 cuts off or reduces the output power of the charger when the resistance of the charger loop resistor is less than the overcurrent protection threshold value.

Preferably, the thermistor may adopt a positive temperature coefficient (PTC) resistor in series, or a negative temperature coefficient (NTC) resistor in parallel, or adopt the manner of the combination of the PTC resistor and the NTC resistor.

The charger output protection circuit may comprise a short protection circuit, an overcurrent protection circuit, and an overvoltage protection circuit, etc.

Furthermore, the above charger further comprises a printed circuit board (PCB) connected with the head of the connector, and the thermistor could be mounted on the PCB.

It should be illustrated that the thermistor can be mounted on the PCB in a several manners, for example, a plug-in is wave-soldered, a patch resistor is reflow-soldered, or "burying resistor", wherein there are two manners for "burying resistor", one is directly burying thermistor, and the other is the "thermistor" made of resistor-capacitor material. The embodiments of the present document do not limit the mounting manner of the thermistor. That is, the thermistor may be a thermistor that the plug-in is wave-soldered on the PCB, or a patch resistor is reflow-soldered on the PCB, or a thermistor that is directly buried into the PCB, or a thermistor that is made of resistor-capacitor material.

Figure 2:
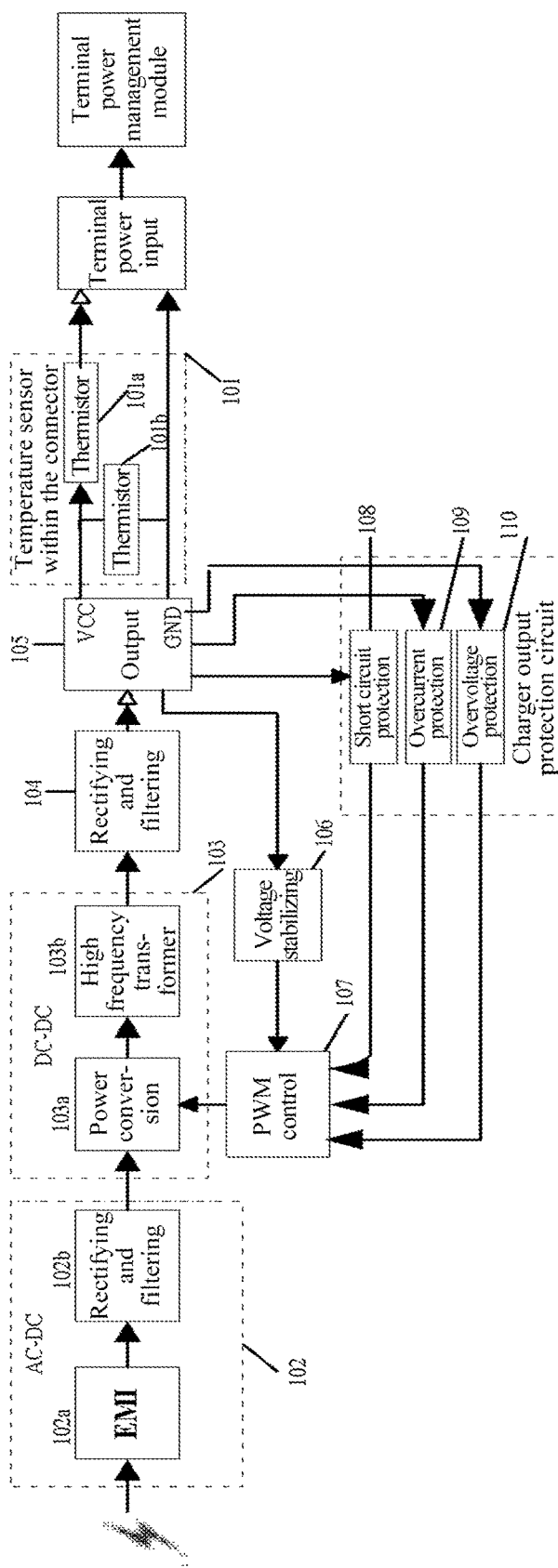
FIG. 2 is a principle framework diagram of the mobile terminal charger in the embodiments of the present document.

Preferably, the above mobile terminal charger may comprise: an AC-DC module (102), a DC-DC module (103), a rectifying filtering (104), an output DC cable (105), a voltage stabilizing circuit (106), a pulse width modulation (PWM) control (IC) module (107), a charge output protection circuit comprising a short circuit protection circuit (108), an overcurrent protection circuit (109), an overvoltage protection circuit (110), etc., a connector, and a thermistor (101). At this time, the principle framework of the mobile terminal charger is shown in FIG. 2.

Wherein, the AC-DC module (102) comprises electromagnetic interference (EMI) input filtering (102A) and input rectifying filtering (102B), thereby converting alternating current to direct current and removing noise and interference in the power grid.

The DC-DC module (103) is mainly consisted of a power conversion circuit (103a) and a high frequency transformer (103b), and regulates the duty ratio of the output voltage by controlling the switching frequency of the switching tube so as to control the output voltage and the current.

For the thermistor (101), the thermistor PTC (101a) is connected in series or the thermistor NTC (101b) is connected in parallel in the head of the connector of the data line or the charger, or the two components are simultaneously implanted to achieve the better safety effect. Thus, the heat on the head of the connector can be detected. When increase of the temperature of the head of the connector is detected, the resistance of the thermistor also changes with the increase of the temperature; when the changed resistor makes the charger loop resistor reach the preset charger protection threshold value, the output power of the charger is cut off or reduced.

Figure 3:
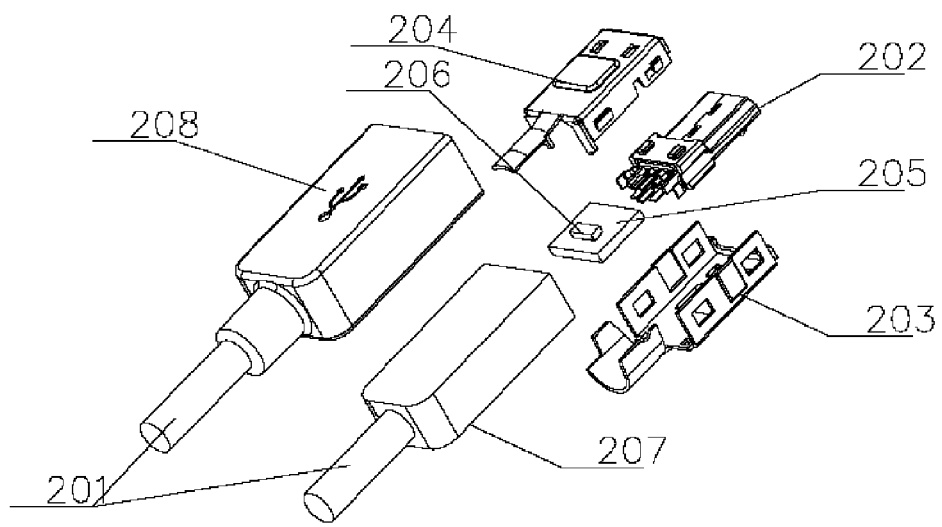
FIG. 3 is an actual structural diagram of the charger in the embodiments of the present document.

FIG. 3 is now taken as an example to introduce the actual structural diagram of the charging temperature protection device of the above mobile terminal, it comprises a charger or a data line output cable (201) (i.e., the output DC cable), a charger or data line output connector terminal (202) (i.e., the head of the connector), a connector shielding front shell (203), a connector shielding rear shell (204), a PCB (205) connected with the connector terminal (202) (the PCB is integrated with the above charger output protection circuit), a thermistor PTC or NTC (206) mounted on the PCB (205), the other end of the PCB is connected with the corresponding node of the output cable (201), the connector shielding shells (203), (204) wrap the rear of the connector terminal (202) and the PCB, an inner model (207), an outer model (shell) (208) are further mounted outside the connector shielding shell.

When the abnormal occurs, and the micro-short circuit occurs at the connector head terminal (202), the portion of the connector terminal generates heat that is transmitted to a thermistor (206) via the connector shielding shells (203), (204); the resistance of the thermistor changes when the thermistor senses the changes of the temperature, the resistance of the charger loop resistor changes according to the changes of the resistance of the connected thermistor, and the output control circuit generates the movement according to the resistance of the loop resistor, the output power is reduced or cut off, the temperature falls.

Figure 4:
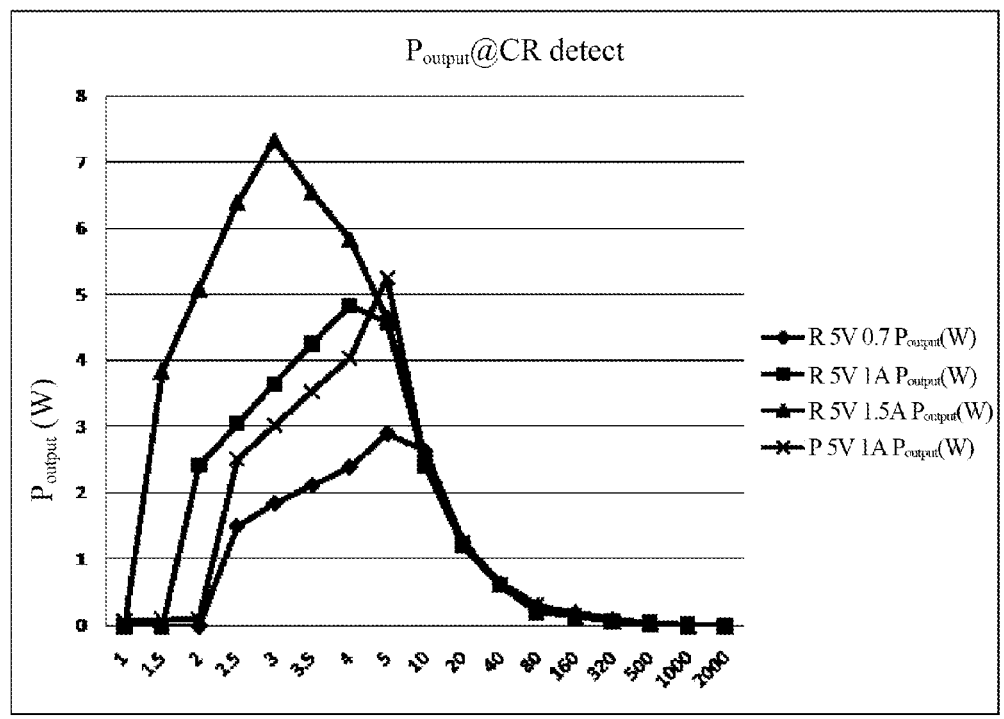
FIG. 4 is a circuit power output CR graph in the embodiments of the present document.

Preferably, it may refer to FIG. 4 of the circuit power output CR graph of the above mobile terminal charger. From the feature of the output CR graph of chargers with different powers in FIG. 4, it can be seen that when the output applied resistance is less than 2 ohm or greater than 200 ohm, the charger output power is substantially close to 0 W. Normally, the PTC resistance is 10 milliohm, and the NTC resistance is in the level of kilohm, so the implantation does not influence the normal operation of the charger. When the micro-short circuit occurs in the outputting of the charger (for example, the direct resistance between the power and the ground is greater than 2 ohm and less than 20 ohm), it can be seen from the corresponding CR graph that it does not reach the initiating condition of the charger short circuit protection, the charger continuously outputs large power, and the head of the charger output connector is continuously heating; when the heating reaches 80-100 degrees, the PTC resistance suddenly increases, and the NTC resistance is reduced approximately to 0.

When the thermistor adopts the implementation manner of the PTC resistor connected in series, the resistance of the charger loop resistor also increases with the increasing of PTC resistance. It can be seen from the corresponding CR graph that the output current of the charger is reduced gradually, the out power of the charger is reduced such that the heating on the connector is reduced; when the temperature gradually increases, the resistance is very great, the output power of the charger is approximately 0.

When the thermistor adopts the implementation manner of the NTC resistor connected in parallel, the NTC resistance is reduced when the temperature of the head of the connector increases, correspondingly, the resistance between the input power of the charger and the ground is reduced; when it is reduced to 2 ohm or approximately 0, after the output current of the charger exceeds the rated operating current, the overcurrent protection circuit (109) of the charger is started; it can be seen from the corresponding CR graph that the output power of the charger is reduced to 0. The corresponding overcurrent protection operation process is: the output current of the charge is refracted to the primary current via the transformer turns ratio, the primary current also starts to increase; the current starts to trigger in the interior logical circuit of the PWM IC module (107), the switching frequency is reduced, and the conducting time remains constant at this time, indicating that the duty ratio is decreased, the output energy is reduced, the output voltage is reduced, the supply voltage of the corresponding PWM IC module (107) starts to reduce; the overcurrent protection circuit of the charger will turn on the protection mode when below a certain range so as to achieve the function of overcurrent protection.

Figure 5:
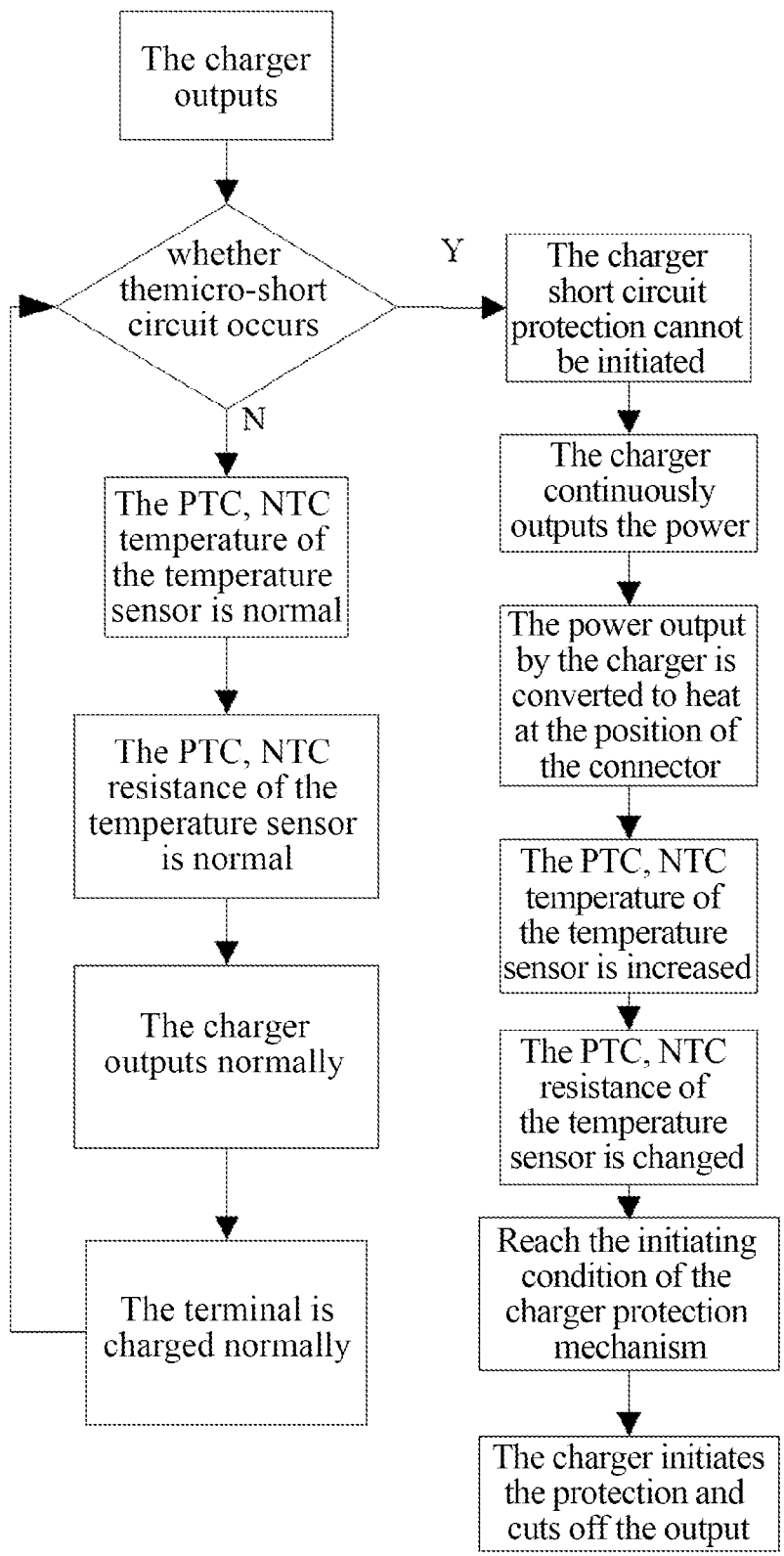
FIG. 5 is a flow diagram of the charging temperature protection.

The process of achieving charging temperature protection by the above device will be introduced in combination with FIG. 5.

It can be seen from FIG. 5 that when the user operates normally without the occurrence of micro-short circuit at the interface of the charging connector, the thermistor senses normal temperature, so the resistance of the thermistor is normal, the charger can output normally and the terminal can be charged normally. When the user operates abnormally, the liquid electric-conductive metal powder, etc. enters the interface of the charging connector, the micro-short circuit occurs at the interface of the charging connector, the micro-short circuit charger short circuit protection cannot be initiated, so the charger continuously outputs power which is converted to heat at the head of the charging connector, and the resistance of the thermistor mounted on the head of the connector increases with the temperature. From the analysis of the CR graph of the charger in FIG. 4, the resistance change of the thermistor may change the resistance of the charger loop resistor so as to reach the protection condition, the charger initiates the protection and turns off the output, thereby avoiding the increase of the temperature of the head of the connector, and meanwhile avoiding the occurrence of safety problem.

It can be seen from the above embodiments that in the technical schemes of the embodiments of the present document, when the abnormal occurs, the change of the resistance of the thermistor mounted on the plug starts the output protection circuit threshold of the charger, the power of the charger is reduced or the output is cut off to decrease the temperature, so as to protect the head of the data line or the charger from damaging. The safety problem is solved with lower cost and the simple and reliable realization.

A person skilled in the art may understand that all or part of the steps in the above methods may be completed by the program instructing relevant hardware, the program may be stored in the computer readable storage medium, such as read only memory, disk or CD, etc. Alternatively, all or part of the steps of the above embodiments may also be achieved by using one or more integrated circuits. Correspondingly, each module/unit in the above embodiments may also be achieved by using hardware, or software function modules. The present application is not limited to any form of the combination of hardware and software.

The described above are only the preferable embodiments of the present document, and are not used for limiting the protection scope of the present document. Any amendment, equivalent replacement, and improvement, etc., made under the spirit and principle of the present document, should be included within the protection scope of the present document.

INDUSTRIAL APPLICABILITY

In the technical schemes of the embodiments of the present document, the thermistor is mounted on the head of the connector; when the abnormal occurs, the temperature increases, the resistance of the thermistor, the PTC or NTC resistor, changes, thereby causing the resistance of the charger loop resistor also to change; when the resistance of the loop resistor reaches the overcurrent or short circuit protection threshold of the charger, the charger cuts off the output, the temperature falls, so as to protect the charger or the head of the data line from damaging.

What I claim is:

1. A mobile terminal charger, comprising: a thermistor and a charger output protection circuit, wherein the charger output protection circuit comprises an overcurrent protection circuit, wherein:
    the thermistor is mounted on a head of a connector, and the thermistor is connected into a charger circuit via a charger direct current (DC) cable, and the thermistor constitutes a charger loop resistor with a resistor in the charger; and
    when the thermistor is a positive temperature coefficient (PTC) resistor, the PTC resistor is connected in series with the resistor in the charger; when a resistance of the PTC resistor increases with a temperature of the head of the connector increasing, a resistance of the charger loop resistor increases, a output current of the charger reduces, and an out power of the charger reduces to make heating on the connector to be reduced; or
    when the thermistor is a negative temperature coefficient (NTC) resistor, the NTC resistor is connected in parallel with the resistor in the charger; when a resistance of the NTC resistor reduces with the temperature of the head of the connector increasing, a resistance between the input power of the charger and ground reduce, the charger output protection circuit is configured to reduce output power of the charger when the resistance of the charger loop resistor is less than an overcurrent protection threshold value.

2. The mobile terminal charger according to claim 1, further comprising: a voltage stabilizing circuit, wherein:
    the voltage stabilizing circuit is configured to, when the resistance of the charger loop resistor is greater than the overcurrent protection threshold value, reduce the output power of the charger.

3. The mobile terminal charger according to claim 1, wherein,
the charger output protection circuit comprises a short protection circuit and an overvoltage protection circuit.

4. The mobile terminal charger according to claim 1, wherein,
the thermistor is mounted on a printed circuit board (PCB) that is connected with the head of the connector.

5. The mobile terminal charger according to claim 4, wherein,
when the thermistor is a plug-in resistor, the plug-in resistor is mounted on the PCB in a manner of wave soldering.

6. The mobile terminal charger according to claim 4, wherein,
when the thermistor is a patch resistor, the patch resistor is mounted on the PCB in a manner of reflow soldering.

7. The mobile terminal charger according to claim 4, wherein,
the thermistor is directly buried into the PCB.

8. The mobile terminal charger according to claim 4, wherein, the thermistor is made of resistor-capacitor material.

9. The mobile terminal charger according to claim 2, wherein,
the charger output protection circuit comprises a short protection circuit and an overvoltage protection circuit.

10. The mobile terminal charger according to claim 2, wherein,
the thermistor is mounted on a printed circuit board (PCB) that is connected with the head of the connector.

11. The mobile terminal charger according to claim 10, wherein, when the thermistor is a plug-in resistor, the plug-in resistor is mounted on the PCB in a manner of wave soldering.

12. The mobile terminal charger according to claim 10, wherein, when the thermistor is a patch resistor, the patch resistor is mounted on the PCB in a manner of reflow soldering.

13. The mobile terminal charger according to claim 10, wherein, the thermistor is directly buried into the PCB.

14. The mobile terminal charger according to claim 10, wherein, the thermistor is made of resistor-capacitor material.

* * * * *